United States Patent
Ohta et al.

Patent Number: 6,104,534
Date of Patent: Aug. 15, 2000

[54] ANTIREFLECTION COATING WITH ELECTROMAGNETIC WAVE SHIELDING EFFECT AND OPTICAL MEMBER HAVING THE ANTIREFLECTION COATING

[75] Inventors: Tatsuo Ohta; Shingo Nakamura; Satoshi Nakano, all of Hachioji, Japan

[73] Assignee: Konica Corporation, Tokyo, Japan

[21] Appl. No.: 09/044,802

[22] Filed: Mar. 20, 1998

[30] Foreign Application Priority Data

| Mar. 24, 1997 | [JP] | Japan | 9-087209 |
| Jun. 17, 1997 | [JP] | Japan | 9-175180 |
| Sep. 17, 1997 | [JP] | Japan | 9-269204 |

[51] Int. Cl.$^7$ .................. G02B 1/11; G02B 5/28
[52] U.S. Cl. ............ 359/588; 359/582; 359/585
[58] Field of Search ............... 359/586, 588, 359/580, 582, 359, 360, 585

[56] References Cited

U.S. PATENT DOCUMENTS

| 5,358,787 | 10/1994 | Fontana et al. | 359/359 |
| 5,362,552 | 11/1994 | Austin | 359/586 |
| 5,407,733 | 4/1995 | Bjornard et al. | 359/359 |
| 5,508,091 | 4/1996 | Austin | 359/359 |
| 5,521,765 | 5/1996 | Wolfe | 359/586 |
| 5,579,162 | 11/1996 | Bjornard et al. | 359/586 |
| 5,667,880 | 9/1997 | Okaniwa | 359/359 |
| 5,719,705 | 2/1998 | Machol | 359/582 |
| 5,763,063 | 6/1998 | Pass et al. | 359/360 |
| 5,776,612 | 7/1998 | Fisher | 359/359 |
| 5,783,049 | 7/1998 | Bright et al. | 359/586 |

*Primary Examiner*—Jon Henry
*Attorney, Agent, or Firm*—Finnegan, Henderson, Farabow, Garrett & Dunner, L.L.P.

[57] ABSTRACT

In an optical member having a coating for reducing a ray reflecting on the coating and for reducing an electromagnetic wave incident on the coating, the optical member includes: a transparent substrate; and the coating including, and formed on the transparent substrate in the order named from the transparent substrate, a first light transmitting thin layer having a high refractive index, a first light transmitting thin layer having a low refractive index, a second light transmitting thin layer having a high refractive index, a second light transmitting thin layer having a low refractive index. At least one of the first light transmitting thin layer having the high refractive index and the second light transmitting thin layer having the high refractive index is a transparent conductive layer having a sheet resistivity of 100 Ω/□ or less.

6 Claims, 8 Drawing Sheets

ANTIREFLECTION COATING WITH ELECTROMAGNETIC WAVE SHIELDING EFFECT AND OPTICAL MEMBER HAVING THE ANTIREFLECTION COATING

BACKGROUND OF THE INVENTION

This invention relates to an antireflection coating with an electromagnetic wave shielding effect and an optical member having the antireflection coating.

In recent years, the bad effect on the human body and the interference to the other apparatus of the electromagnetic waves emitted from Braun tubes and other devices of the office automation equipment and Television sets have posed a problem.

In order to avoid the bad effect of the electromagnetic waves, such a method as to cover the objects with a conductive member such as a metallic mesh through which the opposite side can be seen has heretofore been used.

However, in case of covering the Braun tubes of the office automation equipment or TV sets with these conductive members, there has been a problem that the image surfaces of the Braun tubes become a little difficult to watch due to the thin wires composing the meshes to make the eyes of the operators tired. Further, in case of applying the meshes to the windows of houses or automobiles, it raised a problem that the meshes obstructed the view.

Furthermore, there have been plates with a transparent electromagnetic wave shielding layer etc., however, these electromagnetic wave shielding plates heretofore used are not perfectly transparent and have such problems as colored, insufficient in transmittance, poor in the electromagnetic wave shielding effect, and so forth.

SUMMARY OF THE INVENTION

Accordingly, an object of this invention is to provide an antireflection coating with an electromagnetic wave attenuating effect and an optical member having the antireflection coating with the electromagnetic wave attenuating effect, which is capable of effectively shielding the electromagnetic waves emitted from the Braun tubes and other devices of the office automation equipment or TV sets, never obstructs the view, and is also capable of reducing the fatigue of the eyes.

Moreover, another object of this invention is to provide an antireflection coating with the electromagnetic wave shielding effect, which is capable of obtaining sufficient amount of transmitted light in the broad wavelength range, and even has a high effect of the electromagnetic wave shielding.

The above-mentioned objects of this invention are accomplished by any one of the structures (1)–(42) described below.

(1) An antireflection coating formed on a substrate, which is the one with the electromagnetic wave shielding effect characterized by being composed of light transmitting thin layers not less than three including at least one light transmitting metallic thin layer.

(2) A antireflection coating with the electromagnetic wave shielding effect as set forth in the above structure (1) characterized by comprising at least one layer making up an antireflection coating at each of the positions between the substrate and a light transmitting metallic thin layer in the nearest neighborhood of the substrate and at the farther side, with regard to the substrate, of the farthest-positioned from the substrate, light transmitting metallic thin layer.

(3) An antireflection coating with the electromagnetic wave shielding effect as set forth in the above structure (1) or (2) characterized by that each of the light transmitting metallic thin layers is composed of a plurality of layers.

(4) An antireflection coating with the electromagnetic wave shielding effect as set forth in any one of the above structures (1)–(3) characterized by that the light transmitting metallic thin layers comprise at least one layer of metal selected from Au, Pt, Ag, Co, Mo, Al, and Cu.

(5) A antireflection coating with the electromagnetic wave shielding effect as set forth in any one of the above structures (1)–(4) characterized by that thin layers with a high refractive index are formed on the farther side, with regard to the substrate, of the light transmitting metallic thin layers.

(6) An antireflection coating with the electromagnetic wave shielding effect as set forth in any one of the above structures (1)–(5) characterized by that a light transmitting metallic thin layer is provided between the thin layers of high refractive index.

(7) An antireflection coating with the electromagnetic wave shielding effect as set forth in any one of the above structures (1)–(6) characterized by that at least one transparent conductive layer adjacent to some of the light transmitting metallic thin layers is provided.

(8) An antireflection coating with the electromagnetic wave shielding effect as set forth in any one of the above structures (1)–(7) characterized by that the sheet resistance of the light transmitting metallic thin layer is not higher than 100 Ω/□.

(9) An antireflection coating with the electromagnetic wave shielding effect as set forth in any one of the above structures (8) characterized by that the thickness of the light transmitting metallic thin layer is not larger than 300 Å.

(10) An antireflection coating with the electromagnetic wave shielding effect as set forth in the above structure (8) or (9) characterized by that the thickness of the light transmitting metallic thin layer is not larger than 200 Å.

(11) An antireflection coating formed on a substrate, which is the one with the electromagnetic wave shielding effect characterized by being composed of at least one transparent conductive layer having a thickness not less than 1000 Å and two or more other light transmitting thin layers.

(12) An antireflection coating formed on a substrate, which is the one with the electromagnetic wave shielding effect characterized by being composed of at least one transparent conductive layer having a sheet resistance not higher than 100 Ω□ and two or more other light transmitting thin layers.

(13) An antireflection coating with the electromagnetic wave shielding effect as set forth in the above structure (11) or (12) characterized by that at least one layer making up the antireflection coating is provided on each of the both sides of the aforesaid transparent conductive layer.

(14) An antireflection coating with the electromagnetic wave shielding effect as set forth in any one of the above structures (11)–(13) characterized by that there is provided on the farther side, with regard to the substrate, of the aforesaid transparent conductive layer a light transmitting thin layer having a refractive index lower than that of said transparent conductive layer.

(15) An antireflection coating with the electromagnetic wave shielding effect as set forth in the above structure (14), characterized by that there is provided on the substrate side of the aforesaid transparent conductive layer a light transmitting thin layer having a refractive index smaller than that of said transparent conductive layer and larger than the refractive index, which is smaller than that of the transparent conductive layer, of the light transmitting thin layer, which is provided on the farther side from the substrate of said transparent conductive layer.

(16) An antireflection coating with the electromagnetic wave shielding effect as set forth in any one of the above structures (11)–(13) characterized by that on each of both sides of the aforesaid transparent conductive layer it is formed a light transmitting thin layer having a refractive index lower than that of said conductive layer.

(17) An antireflection coating with the electromagnetic wave shielding effect as set forth in any one of the above structures (11)–(16) characterized by that the aforesaid transparent conductive layer is a layer comprising indium oxide and tin.

(18) An antireflection coating provided on a substrate by forming in consecutive order a light transmitting thin layer with a high refractive index, a light transmitting thin layer with a low refractive index, a light transmitting thin layer with a high refractive index, and a light transmitting thin layer with a low refractive index, which is the one with the electromagnetic wave shielding effect characterized by that at least one of said light transmitting thin layers with a high refractive index is composed of a transparent conductive layer having a thickness not smaller than 1000 Å.

(19) An antireflection coating provided on a substrate by forming in consecutive order a light transmitting thin layer of high refractive index, a light transmitting thin layer with a low refractive index, a light transmitting thin layer with a high refractive index, and a light transmitting thin layer with a low refractive index, which is the one with the electromagnetic wave shielding effect characterized by that at least one of said light transmitting thin layers with a high refractive index is composed of a transparent conductive layer having a sheet resistance not higher than 100 Ω/□.

(20) An antireflection coating provided on a substrate by forming in consecutive order a light transmitting thin layer with a low refractive index, a light transmitting thin layer with a high refractive index, a light transmitting thin layer with a low refractive index, a light transmitting thin layer with a high refractive index, and a light transmitting thin layer with a low refractive index, which is the one with the electromagnetic wave shielding effect characterized by that at least one of said light transmitting thin layers with a high refractive index is composed of a transparent conductive layer having a thickness not smaller than 1000 Å.

(21) An antireflection coating provided on a substrate by forming in consecutive order a light transmitting thin layer with a low refractive index, a light transmitting thin layer with a high refractive index, a light transmitting thin layer with a low refractive index, a light transmitting thin layer with a high refractive index, and a light transmitting thin layer with a low refractive index, which is the one with the electromagnetic wave shielding effect characterized by that at least one of said light transmitting thin layers with a high refractive index is composed of a transparent conductive layer having a sheet resistance not higher than 100 Ω/□.

(22) An optical member characterized by that on an optical substrate member made of a plastic material it is formed an antireflection coating with the electromagnetic wave shielding effect as set forth in any one of the above structures (1)–(21).

(23) An optical member as set forth in the above-described structure (22) characterized by that the aforesaid optical substrate member made of a plastic material is composed of a material having heat resistance up to a temperature not lower than 70° C.

(24) An optical member characterized by that on an optical substrate member made of a glass material it is formed an antireflection coating with the electromagnetic wave shielding wave effect as set forth in any one of the above structures (1)–(21).

(25) An optical member characterized by that on an optical substrate member composed of a flexible sheet it is formed an antireflection coating with the electromagnetic wave shielding effect as set forth in any one of the above structures (1)–(21).

(26) An optical member as set forth in the above-described structure (25) characterized by that the aforesaid optical substrate member composed of a flexible sheet has a polarizing function.

(27) An optical member as set forth in any one of the above-described structures (22)–(25) characterized by that there is provided a hard coating layer between the aforesaid optical substrate member and the antireflection coating with the electromagnetic wave shielding effect.

(28) An optical member as set forth in any one of the above-described structures (22)–(27) characterized by that a hard coating layer is provided on the antireflection coating with the electromagnetic wave shielding effect.

(29) An optical member characterized by being formed through joining the aforesaid optical substrate member as set forth in the above-described structures (22)–(28) to another optical member.

(30) An optical member to be joined to another optical member for use characterized by that an antireflection coating with the electromagnetic wave shielding effect including a conductive layer is formed on the optical surface of the aforesaid optical substrate member on the side to be joined to said another optical member.

(31) An optical member as set forth in the above-described structure (30) characterized by that the aforesaid conductive layer is a transparent conductive layer with a thickness not smaller than 1000 Å and the refractive index n1 of the first layer at the side of the aforesaid optical substrate member provided with the antireflection coating with the electromagnetic wave shielding effect satisfies the following condition:

$$no < n1 < nt,$$

where no and n t are the refractive indices of the aforesaid optical substrate member and said transparent conductive layer respectively.

(32) An optical member as set forth in the above-described structure (30) characterized by that the aforesaid conductive layer is a transparent conductive layer with a thickness not smaller than 1000 Å and the refractive index nf of the farthest layer from the aforesaid optical substrate member satisfies the following condition:

$$na < nf < nt,$$

where na and nt are the refractive indices of the material of the aforesaid another optical member immediately adjacent to said farthest layer and said transparent conductive layer respectively.

(33) An optical member as set forth in the above-described structure (31) or (32) characterized by that the aforesaid conductive layer is a transparent layer comprising at least indium oxide.

(34) An optical member as set forth in the above-described structure (31) or (32) characterized by that the aforesaid conductive layer is a transparent layer comprising at least indium oxide and tin.

(35) An optical member as set forth in the above-described structure (30) characterized by that the aforesaid conductive layer is a light transmitting metallic thin layer and the refractive index n1 of the first layer at the side of the aforesaid optical substrate member provided with the antireflection coating with the electromagnetic wave shielding effect satisfies the following condition:

the refractive index of the aforesaid optical substrate member<n1.

(36) An optical member as set forth in the above-described structure (30) characterized by that the aforesaid conductive layer is a light transmitting metallic thin layer and the refractive index nf of the farthest layer from the aforesaid optical substrate member satisfies the following condition:

na<nf, where na is the refractive index of the material of the aforesaid another optical member immediately adjacent to said farthest layer.

(37) An optical member as set forth in the above-described structure (35) or (36) characterized by that the aforesaid light transmitting metallic thin layer comprises at least one of the metals Au, Ag, Cu, Pt, Mo, Co, and Al.

(38) An optical member as set forth in any one of the above-described structures (30)–(37) characterized by that the sheet resistance of the aforesaid conductive layer is not higher than 100 Ω/□.

(39) An optical member as set forth in any one of the above-described structures (30)–(38) characterized by that the aforesaid optical substrate member is composed of a flexible sheet.

(40) An optical member as set forth in the above-described structure (39) characterized by that the aforesaid flexible sheet has a light polarizing function.

(41) An optical member as set forth in any one of the above-described structures (29)–(40) characterized by that at least one of the aforesaid optical substrate member and the aforesaid another optical member is composed of a polycarbonate resin.

(42) An optical lens comprising the optical member as set forth in the above-described structure (39) or (40) between the lens pieces.

DETAILED DESCRIPTION OF THE INVENTION

Figure 1:
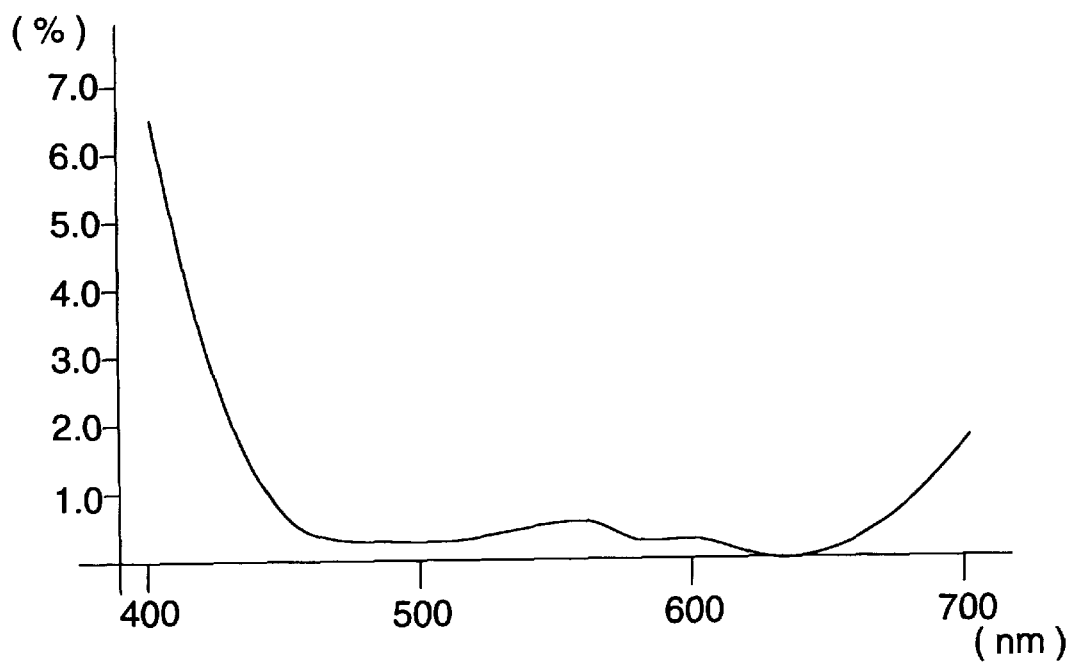
FIG. 1 is a drawing showing the spectral reflectance of the sample 1.
Figure 2:
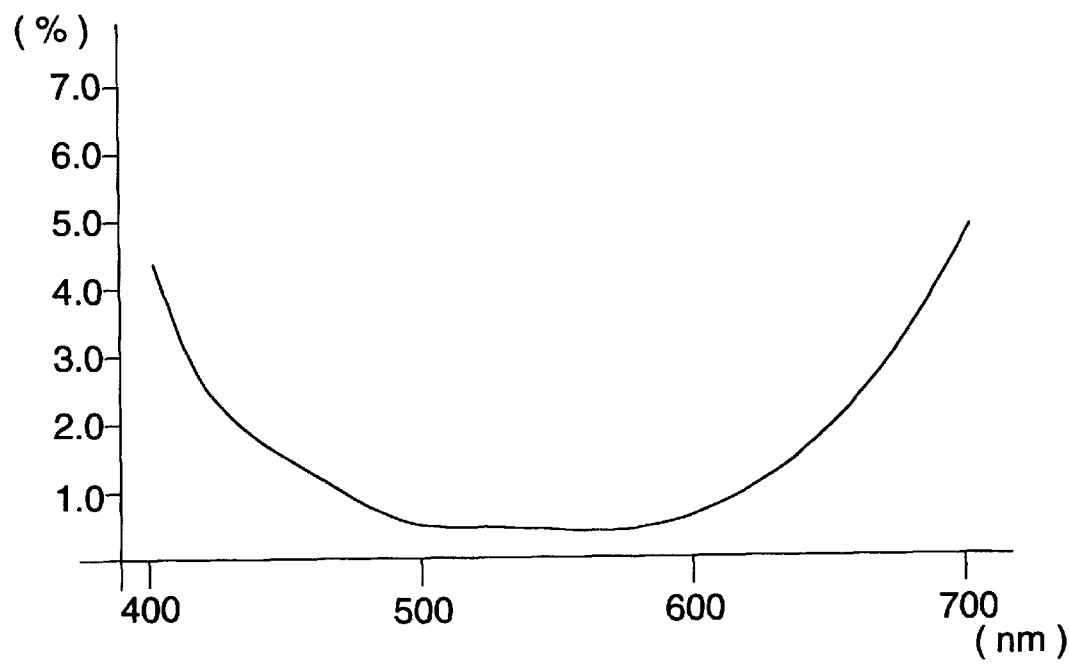
FIG. 2 is a drawing showing the spectral reflectance of the sample 2.
Figure 3:
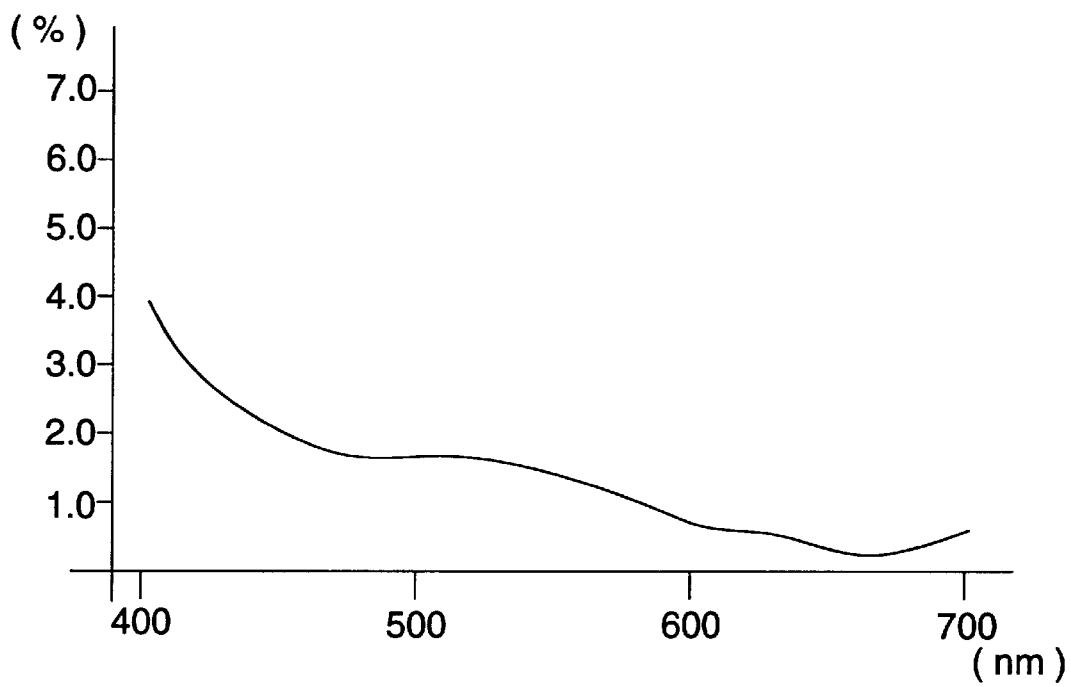
FIG. 3 is a drawing showing the spectral reflectance of the sample 3.
Figure 4:
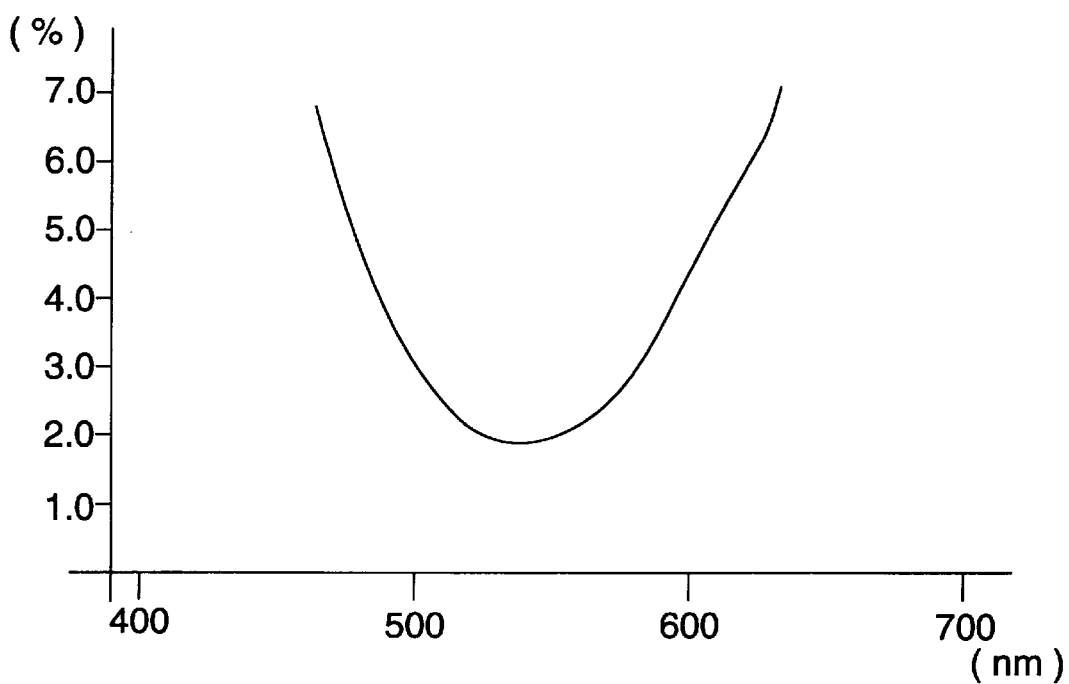
FIG. 4 is a drawing showing the spectral reflectance of the sample 4.
Figure 5:
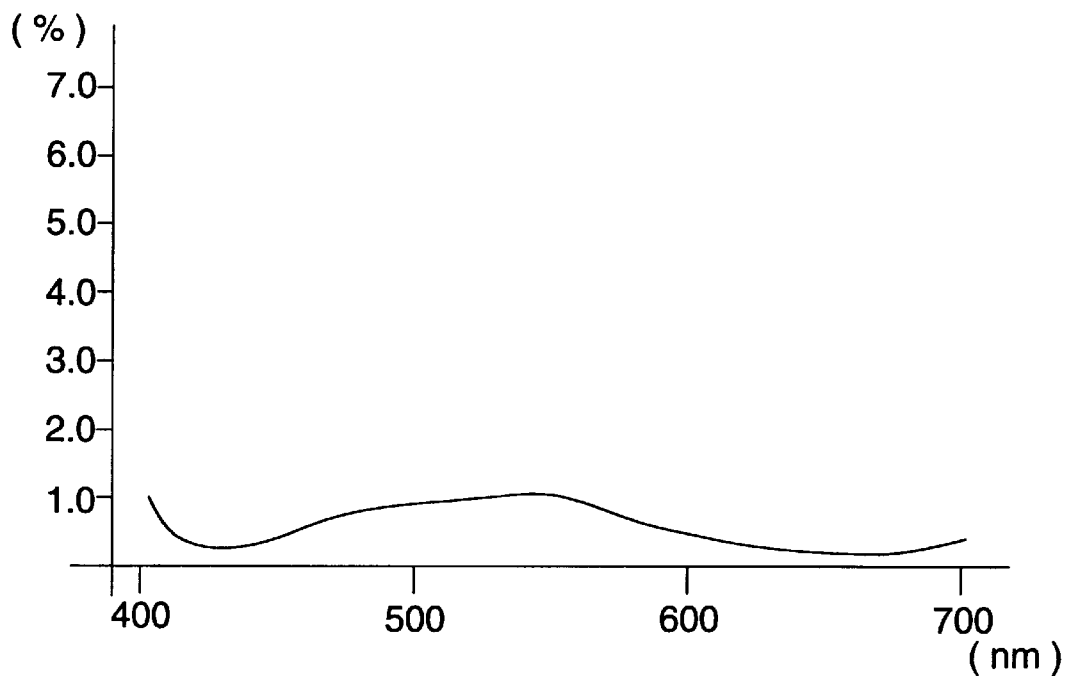
FIG. 5 is a drawing showing the spectral reflectance of the sample 5.
Figure 6:
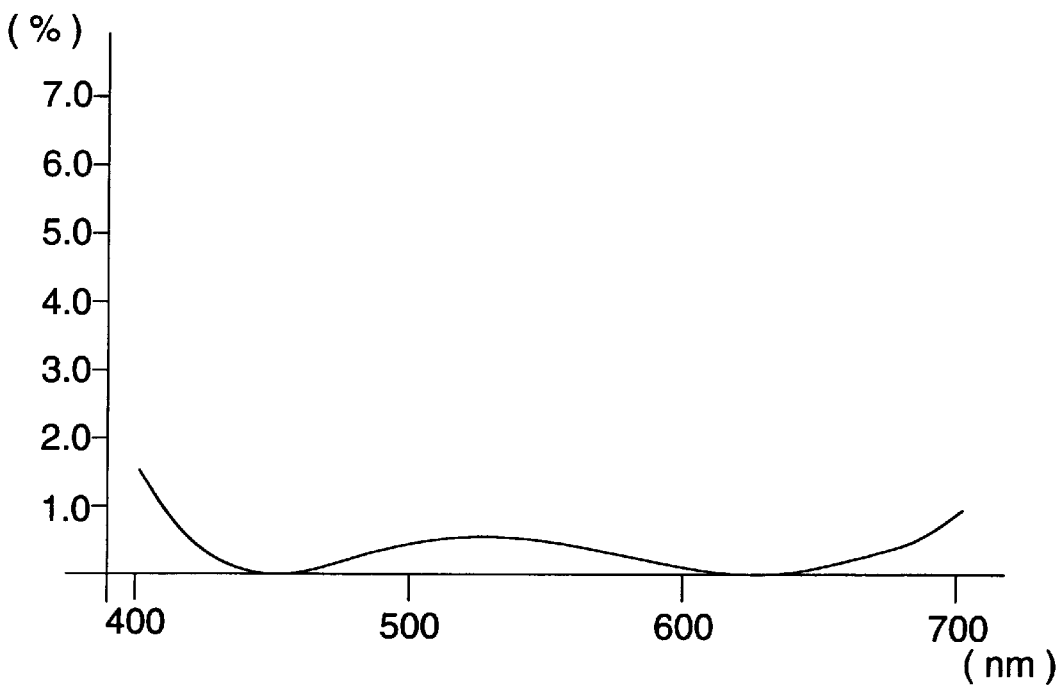
FIG. 6 is a drawing showing the spectral reflectance of the sample 6.
Figure 7:
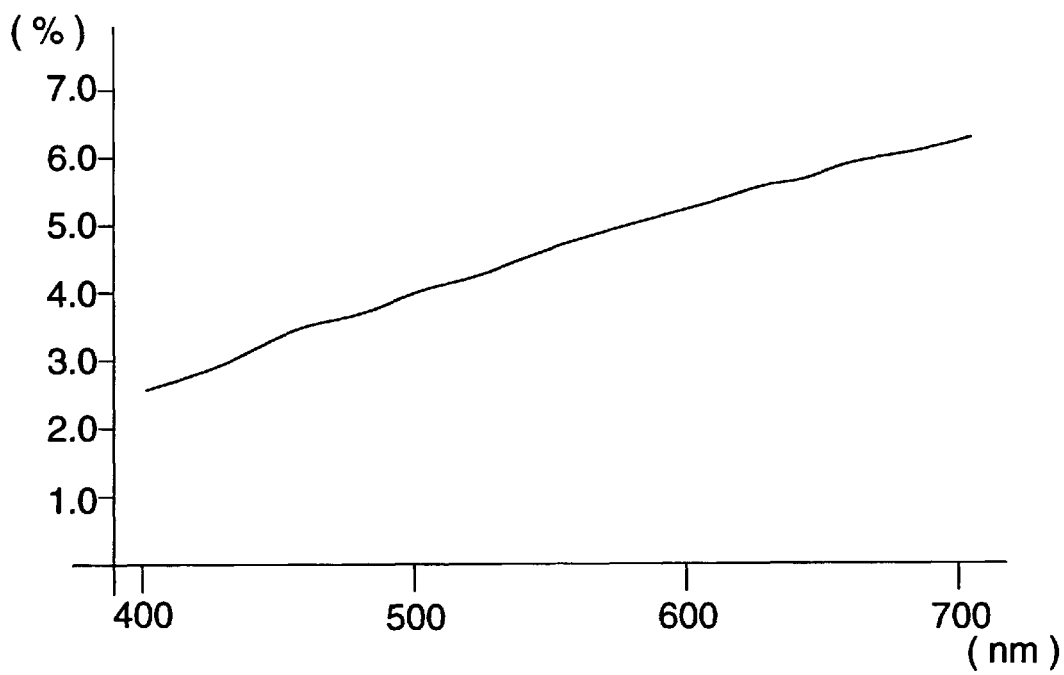
FIG. 7 is a drawing showing the spectral reflectance of the sample 7.
Figure 8:
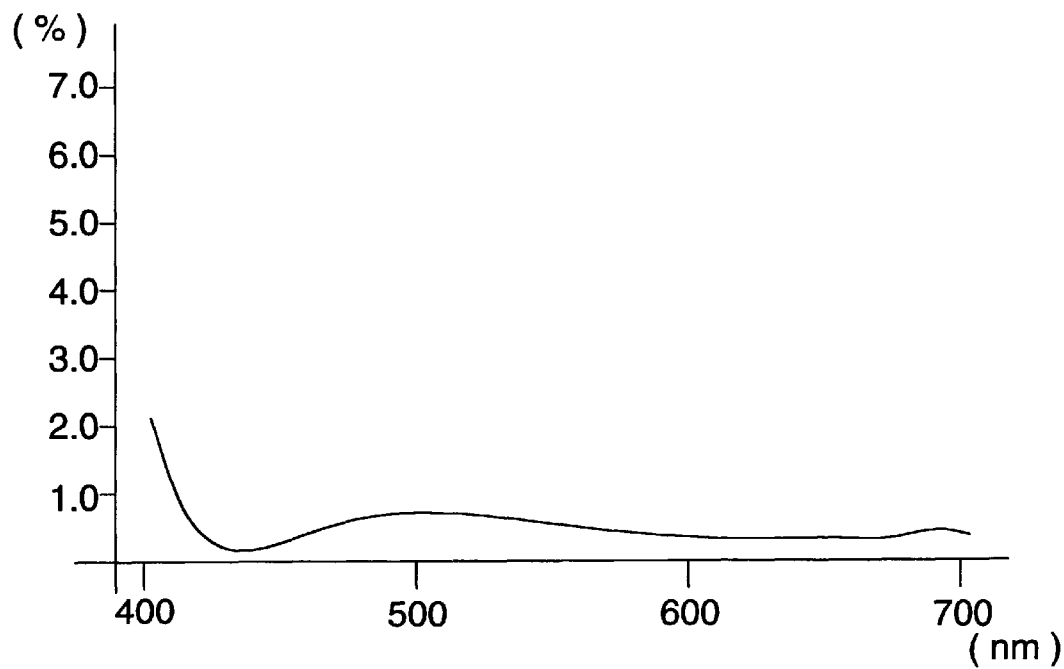
FIG. 8 is a drawing showing the spectral reflectance of the sample 8.

Hereinafter, this invention will be explained in detail.

In this invention, the term 'light transmitting' means 'to transmit visible light effectively'.

It is desirable for preventing the fatigue of the eye that the optical member having antireflection coating of this invention has transmittance not less than 25% as the overall optical member with the antireflection coating in case of placing it for use in front of the Braun tubes of office automation equipment and TV sets.

In this invention, the light transmitting metallic thin layer, the transparent conductive layer with a thickness not smaller than 1000 Å, or the transparent conductive layer having a sheet resistance not higher than 100 Ω/□ (hereinafter in some cases these are collectively referred to as a conductive layer) has electrical conductivity, and shields against electromagnetic waves effectively. Furthermore, it is more desirable that the sheet resistance of the light transmitting metallic thin layer or the transparent conductive layer is not higher than 50 Ω/□.

In case of using the transparent conductive layer as the conductive layer, if the sheet resistance is higher than 100 Ω/□, the transparent conductive layer can not effectively shields against electromagnetic waves.

Regarding the conductivity of the conductive layer, the higher conductivity gives better shielding effect, however, the larger thickness of the film for the purpose of higher conductivity makes the light transmittance lower or gives some other defects, hence it is desirable to make the film thickness appropriate for the usage. In the case of light transmitting metallic th in layer, the film thickness should desirably be not larger than 300 Å, and more desirably not larger than 200 Å.

Moreover, in order to obtain a sufficient electromagnetic wave shielding effect, it is desirable that the sheet resistance of the light transmitting metallic thin layer is not higher than 100 Ω/□.

According to this invention, laminating in the following order the first light transmitting thin layer with a high refractive index, the first light transmitting thin layer with a low refractive index, the second light transmitting thin layer with a high refractive index, and the second light transmitting thin layer with a low refractive index, and making a t least one of said first light transmitting thin layer with a high refractive index and second light transmitting thin layer with a high refractive index the transparent conductive layer, make it possible to obtain a high electromagnetic shielding effect. Moreover, laminating the layers in the order of the first light transmitting thin layer with a high refractive index, the first light transmitting thin layer with a low refractive index, the second light transmitting thin layer with a high refractive index, and the second light transmitting thin layer with a low refractive index reduces the reflectance of light and gives sufficient transmitted amount of light. Besides, transmitting light in a broad wavelength range results in the effect of no unnecessary coloring.

Au, Pt, Ag, Co, Mo, Al, and Cu can be used as the metal composing the light transmitting metallic thin layer.

As for the transparent conductive layer, for example, indium oxide, indium oxide doped with tin (ITO), tin oxide, tin oxide doped with antimony, zinc oxide, manganese oxide, and mixtures of these can be used. Further, each of the transparent conductive layers mentioned above can be regarded as the light transmitting thin layer with a high refractive index.

Regarding ITO, its sheet resistance can be varied with the content of tin, however, in order to reduce this invention to practice it is desirable that the tin content is not higher than 10 weight %.

These substances composing the transparent conductive layer can be used as the evaporation material for the transparent conductive layer by composing them beforehand in the predetermined ratio. Further, the transparent conductive layer can be prepared by evaporation in a reactive gas using the metal before oxidation as the evaporation material, or by exposing the metal film composed of the metal before oxidation to the plasma of a reactive gas after the formation of the film.

As for the light transmitting thin layer, the above-mentioned transparent conductive layer, titanium oxide, zirconium oxide, cerium oxide, tantalum oxide, praseodymium oxide, hafnium oxide, aluminum oxide, silicon oxide, etc., and the mixtures of these can be used.

In case where the conductive reflection reducing film surface is not joined to another optical member, it is desirable that the refractive index of the low refractive index material is not higher than that of the substrate, and still further it is more desirable to be not higher than 1.55, and for the material silicon dioxide, silicon monoxide, magnesium fluoride are used. As for high refractive index material, it is desirable to have a refractive index not lower than 1.8, and titanium oxide, zirconium titanate, zirconium oxide, cerium oxide, tantalum oxide, praseodymium oxide, hafnium oxide, etc., and the mixtures of these are appropriate. Regarding the material having a refractive index between 1.55 and 1.8, an equivalent film composed of alternately superposed high refractive index layers and low refractive index layers can be used.

In case of forming the high refractive index layer composed of a transparent conductive layer, a dielectric substance can be substituted for a part of the transparent conductive layer for the purpose of controlling the resistivity and coloring and enhancing the film strength. In other words, another light transmitting dielectric thin film is formed before and/or after the formation of the transparent conductive layer to a thickens within a range capable of obtaining the desired sheet resistance value and reflection reducing property, and together with said transparent conductive layer can be regarded as a conductive layer collectively.

According to this invention, in case of forming the light transmitting metallic thin layers on both sides of the light transmitting thin layer with a high refractive index, it is desirable to make the refractive index of the light transmitting thin layer with a high refractive index not lower than 1.5.

In case where the thickness of the light transmitting metallic thin layer is made thin in order to enhance the light transmitting property, sometimes the metal layer composing the light transmitting metallic thin layer is formed in an island-like manner, resulting in the poor conductivity for obtaining the sufficient electromagnetic wave shielding effect, however, by providing a transparent conductive layer directly adjacent to the light transmitting metallic thin layer, a conductivity, which can not be estimated from the conductivity of the light transmitting metallic thin layer alone and that of the transparent conductive layer alone, is obtained for securing the sufficient electromagnetic wave shielding effect.

The means for forming the light transmitting metallic thin layer, the transparent conductive layer, and the other light transmitting thin layers composing the conductive layer is not particularly limited, but any well-known means can be used for the formation. As for the means for forming these thin layers in this invention, for example, evaporation method, radio-frequency exited ion-plating method (hereinafter referred to as R.F. ion plating method for simplicity's sake), sputtering method, and CVD method can be cited.

The hard coating layer can be formed by well-known methods using a resin such as a thermosetting resin, an ultraviolet-ray curing resin, and an electron-beam curing resin.

In this invention, the hard coating layer can be provided either directly on the optical substrate member (hereinafter referred to as optical member portion too) as an undercoating layer, or on the antireflection coating as an overcoating layer. By providing the antireflection coating on the hard coating layer provided on the substrate member, the adhesion of the antireflection coating and the surface hardness of the substrate member can be improved. In this case, if the refractive index of the hard coating layer is made as close as possible to that of the substrate member, the uneven coloring can be reduced.

Before providing the hard coating layer and the antireflection coating, some well-known pre-processing such as a processing by silane compounds, a plasma processing, an ultraviolet ray processing and so forth can be carried out to the hard coating layer and the antireflection coating to improve the adhesion and strength of the layers.

To the surface of the antireflection coating and the optical member having the antireflection coating a water-repellent finish can be applied. The water-repellent treatment produces a clouding preventing effect and a smudge preventing effect; that is favorable.

As for the optical substrate member for forming the antireflection coating, any member having transparency is appropriate for use, and a plastic substrate and a glass substrate are practically used. Regarding the plastic substrate, it is desirable to have the heat resistance and strength enough to withstand heating and temperature rise at the time of operation of the coating.

Further, as for the optical member portion, some member made of a plastic or a glass material, a flexible sheet, and so forth can be used. Regarding the shape of the optical member portion, lens, sheet, plate, and so forth are appropriate for use. If the optical member portion is made of a plastic material, it should desirably have heat resistance to withstand the temperature not lower than 70° C.

Still further, in the case of the optical member provided with the antireflection coating with the electromagnetic wave shielding effect at the optical member portion, the hard coating layer may be provided either between the antireflection coating with the electromagnetic wave shielding effect and the optical member portion, or on the antireflection coating with the electromagnetic wave shielding effect.

As the embodiment of the hard coating layer, the above-mentioned ones are appropriate.

Besides, regarding the first layer of the antireflection coating with the electromagnetic wave shielding effect at said optical member portion side, its refractive index n1 should desirably satisfy the following condition:

$$no < n1 < nt,$$

where no and nt are refractive indices of said optical member portion and the aforesaid transparent conductive layer respectively.

In addition, the optical member of this invention may be formed by joining the aforesaid optical member portion to another optical member portion with the antireflection coating with the electromagnetic wave shielding effect provided between them. In that case, regarding the first and second layer, as viewed from the side of said another optical member portion, of the antireflection coating with the electromagnetic wave shielding effect, their refractive indices na1 and na2 should desirably satisfy the following condition:

$$na2 < na1 < nt.$$

As the embodiment of the optical member formed by joining the aforesaid optical member portion to another optical member portion with the antireflection coating with the electromagnetic wave shielding effect provided between them, a lens, a plate, a sheet, and so forth can be cited.

In this invention, the substrate, the hard coating layer, and so forth can be colored up to an extent not to affect their transparency substantially.

In order to obtain desired hue, the following two methods and some other can be used:

(1) during the formation of the thin films, some dye is deposited by evaporation at the same time in the vacuum tank, and (2) some dye or some light absorbing agent for the specified wavelength is intermixed into the substrate, the undercoating, and the overcoating, or dyeing them. By combining these processing with the antireflection coating with the electromagnetic wave shielding effect, such effects as cutting the ultra-violet rays, cutting the infrared rays, enhancing the contrast, and so forth as well as the electromagnetic wave shielding effect can be obtained.

Furthermore, the optical member of the invention can be given the function of polarizing light too.

EXAMPLES

Example 1

An ultraviolet-ray curing resin was coated on transparent acrylic resin substrates and polycarbonate substrates, and then they were irradiated by the ultraviolet ray to form hard coatings, thus transparent acrylic resin substrates with a hard coating layer (hereinafter referred to as 'the acrylic substrate' supply) and transparent polycarbonate substrates with a hard coating layer (hereinafter referred to as 'the polycarbonate substrate' simply) were prepared.

Next, the antireflection coating was formed on each of the acrylic substrates and polycarbonate substrates in accordance with the following processes to prepare samples 1–7.

Sample 1 (This Invention)

On the acrylic substrate, the layer of the mixture of indium oxide and tin (hereinafter referred to as ITO) comprising 5 wt. % of tin, having a thickness of 450 Å, was formed by R.F. ion plating process as the first layer, and the Au layer with a thickness of 150 Å was formed by vacuum evaporation process as the second layer, and then the layer of the mixture of titanium oxide and zirconium oxide (hereinafter referred to as the mixture A) with a thickness of 450 Å as the third layer was formed by vacuum evaporation process; thus the optical member provided with the antireflection coating was obtained.

This optical member has a layer structure composed of the acrylic substrate/the light transmitting thin layer with a high refractive index/the light transmitting metallic thin layer/the light transmitting thin layer with a high refractive index.

Sample 2 (This Invention)

On the acrylic substrate, the ITO layer with a thickness of 450 Å was formed by R.F. ion plating process as the first layer, and the Au layer with a thickness of 150 Å was formed by vacuum evaporation process as the second layer, and then the layer of the mixture A with a thickness of 250 Å was formed by vacuum evaporation process as the third layer; thus the antireflection coating was formed. By forming the layer of the silicon dioxide with a thickness of 400 Å by vacuum evaporation process as the fourth layer, the optical member provided with the antireflection coating was obtained.

This optical member has a layer structure composed of the acrylic substrate/the light transmitting thin layer with a high refractive index/the light transmitting metallic thin layer/the light transmitting thin layer with a high refractive index/the light transmitting thin layer with a low refractive index.

Sample 3 (This Invention)

On the acrylic substrate, the layer of silicon dioxide with a thickness of 350 Å was formed by vacuum evaporation process as the first later, and the ITO layer with a thickness of 380 Å was formed by R.F. ion plating process as the second layer, and then the Au layer with a thickness of 100 Å was formed by vacuum evaporation process as the third layer, and next, the ITO layer with a thickness of 170 Å was formed by R.F. ion plating process as the fourth layer, and further, the layer of silicon dioxide with a thickness of 550 Å was formed by vacuum evaporation process as the fifth layer; thus the optical member provided with the antireflection coating was obtained.

This optical member has a layer structure composed of the acrylic substrate/the light transmitting thin layer with a low refractive index/the light transmitting thin layer with a high refractive index/the light transmitting metallic thin layer/the light transmitting thin layer with a high refractive index/the light transmitting thin layer with a low refractive index.

Sample 4 (This Invention)

On the polycarbonate substrate, the Pt layer with a thickens of 30 Å was formed by vacuum evaporation process as the first layer, and the Ag layer with a thickness of 100 Å was formed by vacuum evaporation process as the second layer, and then the ITO layer with a thickness of 400 Å was formed by R.F. ion plating process with a voltage of −100V applied as the third layer; thus the optical member provided with the antireflection coating was obtained.

This optical member has a layer structure composed of the polycarbonate substrate/light transmitting metallic thin layer/the light transmitting metallic thin layer/the light transmitting thin layer with a high refractive index.

Sample 5 (This Invention)

On one side of the polycarbonate substrate, the layer of aluminum oxide with a thickness of 780 Å was formed by vacuum evaporation process as the first layer, and the ITO layer with a thickness of 1270 Å was formed by R.F. ion plating process as the second layer, and then the layer of silicon dioxide with a thickness of 890 Å was formed by vacuum evaporation process as the third layer. Further, on the other side, the same first, second, and third layers as mentioned above were formed; thus the optical member provided with the antireflection coatings on both sides was obtained.

This optical member has a layer structure composed of the light transmitting thin layer with a high refractive index/the light transmitting conductive layer/the light transmitting thin layer with a low refractive index/polycarbonate substrate/the light transmitting thin layer with a low refractive index/the light transmitting conductive layer/the light transmitting thin layer with a high refractive index.

Sample 6 (This Invention)

On one side of the polycarbonate substrate, the layer of silicon dioxide with a thickness of 360 Å was formed by vacuum evaporation process as the first layer, and the layer of the mixture A with a thickness of 130 Å was formed by vacuum evaporation process as the second layer, and then the layer of silicon dioxide with a thickness of 360 Å was formed by vacuum evaporation process as the third layer, and next, the layer of ITO with a thickness of 1270 Å was formed by R.F. ion plating process as the fourth layer, and finally, the layer of magnesium fluoride with a thickness of 940 Å was formed by vacuum evaporation process. Further, on the other side, the same first, second, third, fourth, and fifth layers as mentioned above were formed; thus the optical member provided with the antireflection coatings on both sides was obtained.

This optical member has a layer structure composed of the light transmitting thin layer with a high refractive index/the light transmitting conductive layer/the light transmitting thin layer with a low refractive index/the light transmitting thin layer with a high refractive index/the light transmitting thin layer with a low refractive index/polycarbonate substrate/the light transmitting thin layer with a low refractive index/the light transmitting thin layer with a high refractive index/the light transmitting thin layer with a low refractive index/the light transmitting conductive layer/the light transmitting thin layer with a high refractive index.

Sample 7 (Comparison)

On the polycarbonate substrate, the Ag layer with a thickness of 150 Å was formed by vacuum evaporation process; thus the optical member provided with a conductive layer was obtained.

This optical member has a layer structure composed of the polycarbonate substrate/the light transmitting metallic thin layer.

Regarding the above-described samples 1–7, the spectral reflectance, the electromagnetic wave shielding efficiency, and the adhesion of the films were measured in accordance with the following description.

"Spectral Reflectance"

By means of a spectrophotometer, the reflectance in each of the measuring wave lengths was measured.

"Electromagnetic Wave Shielding Efficiency"

The attenuation factor of the input signal was measured at 100 MHz, and it was shown in dB unit.

"The Adhesion of the Film"

The adhesion was rated by the degree of peeling off when the sticking tape put on the sample surfaces was pulled in the peeling off operation in the direction perpendicular to the substrate.

A: The antireflection coating did not peel off.
B: The antireflection coating peeled off.

In FIGS. 1–7 the spectral reflectance curves of samples 1–7 are shown respectively. In these figures, the abscissa indicates the wavelength of light and the ordinate indicates the reflectance (%).

In Table 1, the results of the measurement of the electromagnetic wave shielding efficiency and the adhesion of film are shown. Further, in the table the reflectance values at the wavelength of 540 nm and the values of the sheet resistance of the conductive layers are noted.

TABLE 1

| Sample No. | Reflectance (%) | Electromagnetic shielding efficiency (dB) | Sheet resistance of conductive layer (Ω/□) | Adhesion of film | |
|---|---|---|---|---|---|
| 1 | 0.6 | 20 | 30 | A | This invention |
| 2 | 0.5 | 20 | 25 | A | This invention |
| 3 | 1.4 | 20 | 30 | A | This invention |
| 4 | 1.9 | 25 | 10 | A | This invention |
| 5 | 0.9 | 20 | 30 | A | This invention |
| 6 | 0.5 | 20 | 35 | A | This invention |
| 7 | 45 | 25 | 10 | B | Comparison |

Regarding the samples 1–6, they all have a low reflectance in visible region, a good efficiency of the electromagnetic wave shielding, and an excellent adhesion of the film. On the contrary, the sample 7 has a high reflectance of light and a poor adhesion of the film; besides, it has got yellowish color on its surface with passage of the days.

Example 2

The antireflection coating with the electromagnetic wave shielding effect was formed on the polycarbonate substrate described in the example 1 in accordance with the following description to prepare the samples 8–13.

Sample 8 (This Invention)

On the polycarbonate substrate, the antireflection coating with the electromagnetic wave shielding effect composed of the following four layers was formed successively.

The first layer: the layer of zirconium oxide with a thickness of 150 Å formed by vacuum evaporation process.

The second layer: the layer of silicon dioxide with a thickness of 310 Å formed by vacuum evaporation process.

The third layer: the layer of ITO (5% of Sn content) with a thickness of 1350 Å formed by R.F. ion plating process.

The fourth layer: the layer of silicon dioxide with a thickness of 900 Å formed by vacuum evaporation process.

This optical member has a layer structure composed of the transparent substrate/the light transmitting thin layer with a high refractive index/the light transmitting thin layer with a low refractive index/the light transmitting thin layer with a high refractive index (transparent conductive layer)/the light transmitting thin layer with a low refractive index.

Sample 9 (This Invention)

On the polycarbonate substrate, the antireflection coating with electromagnetic wave shielding effect composed of the following five layers was formed successively.

The first layer: the layer of silicon dioxide with a thickness of 2200 Å formed by vacuum evaporation process.

The second layer: the layer of zirconium titanate with a thickens of 260 Å formed by vacuum evaporation process.

The third layer: the layer of silicon dioxide with a thickness of 350 Å formed by vacuum evaporation process.

The fourth layer: the layer of ITO (5% of Sn content) with a thickness of 1500 Å formed by R.F. ion plating process.

The fifth layer: the layer of silicon dioxide with a thickness of 920 Å formed by vacuum evaporation process.

This optical member has a layer structure composed of the transparent substrate/the light transmitting thin layer with a low refractive index/the light transmitting thin layer with a high refractive index/the light transmitting thin layer with a low refractive index/the light transmitting thin layer with a high refractive index (transparent conductive layer)/the light transmitting thin layer with a low refractive index.

Sample 10 (This Invention)

On the polycarbonate substrate, the antireflection coating with the electromagnetic wave shielding effect composed of the following five layers was formed successively.

The first layer: the layer of zirconium titanate with a thickens of 150 Å formed by vacuum evaporation process.

The second layer: the layer of aluminum oxide with a thickness of 550 Å formed by vacuum evaporation process.

The third layer: the layer of zirconium titanate with a thickness of 240 Å formed by vacuum evaporation process.

The fourth layer: the layer of ITO (5% of Sn content) with a thickness of 1300 Å formed by R.F. ion plating process.

The fifth layer: the layer of silicon dioxide with a thickness of 940 Å formed by vacuum evaporation process.

This optical member has a layer structure composed of the transparent substrate/the light transmitting thin layer with a high refractive index/the light transmitting thin layer with a low refractive index/the light transmitting thin layer with a high refractive index/the light transmitting thin layer with a high refractive index (the transparent conductive layer)/the light transmitting thin layer with a low refractive index. Further, concerning the light transmitting thin layer of aluminum oxide, it is actually the light transmitting thin layer having a medium refractive index, but it is regarded as the one with a low refractive index in case of having lower refractive index compared with the adjacent layer, and if it has a higher refractive index than the adjacent layer, it is regarded as the one with a high refractive index.

The color of the transparent conductive layer can be changed by changing the conditions of evaporation process.

Sample 11 (This Invention)

On the polycarbonate substrate, the antireflection coating with electromagnetic wave shielding effect composed of the following five layers was formed successively.

The first layer: the layer of silicon dioxide with a thickness of 360 Å formed by vacuum evaporation process.

The second layer: the conductive layer with a thickness of 220 Å formed by mixed vacuum evaporation of In and Sn in the oxygen ambience subjected to R.F.-discharging with a rate of 120 Å/min. and 6 Å/min. respectively.

The third layer: the layer of silicon dioxide with a thickness of 350 Å formed by vacuum evaporation process.

The fourth layer: the conductive layer with a thickness of 1400 Å formed by mixed vacuum evaporation of In and Sn in the oxygen ambience subjected to R.F.-discharging with a rate of 120 Å/min. and 6 Å/min. respectively.

The fifth layer: the layer of silicon dioxide with a thickness of 930 Å formed by vacuum evaporation process.

This optical member has a layer structure composed of the transparent substrate/the light transmitting thin layer with a low refractive index/the light transmitting thin layer with a high refractive index (the transparent conductive layer)/the light transmitting thin layer with a low refractive index/the light transmitting thin layer with a high refractive index (the transparent conductive layer)/the light transmitting thin layer with a low refractive index.

Sample 12 (This Invention)

On the polycarbonate substrate, the antireflection coating with the electromagnetic wave shielding effect composed of the following five layers was formed successively.

The first layer: the layer of silicon dioxide with a thickness of 360 Å formed by vacuum evaporation process.

The second layer: the conductive layer with a thickness of 220 Å formed by mixed vacuum evaporation of In and Sn in the oxygen ambience subjected to R.F.-discharging with a rate of 200 Å/min. and 10 Å/min. respectively.

The third layer: the layer of silicon dioxide with a thickness of 350 Å formed by vacuum evaporation process.

The fourth layer: the conductive layer with a thickness of 1400 Å formed by mixed vacuum evaporation of In and Sn in the oxygen ambience subjected to R.F.-discharging with a rate of 120 Å/min. and 6 Å/min. respectively.

The fifth layer: the layer of silicon dioxide with a thickness of 930 Å formed by vacuum evaporation process.

This optical member has a layer structure composed of the transparent substrate/the light transmitting thin layer with a low refractive index/the light transmitting thin layer with a high refractive index (the transparent conductive layer)/the light transmitting thin layer with a low refractive index/the light transmitting thin layer with a high refractive index (the transparent conductive layer)/the light transmitting thin layer with a low refractive index.

Sample 13 (Comparison)

On the polycarbonate substrate, the antireflection coating with the electromagnetic wave shielding effect composed of the following four layers was formed successively.

The first layer: the layer of ITO (5% of Sn content) with a thickness of 280 Å formed by R.F. ion plating process.

The second layer: the layer of silicon dioxide with a thickness of 270 Å formed by vacuum evaporation process.

The third layer: the layer of zirconium titanate with a thickness of 550 Å formed by vacuum evaporation process.

The fourth layer: the layer of silicon dioxide with a thickens of 1000 Å formed by vacuum evaporation process.

This optical member has a layer structure composed of the transparent substrate/the light transmitting thin layer with a high refractive index (the transparent conductive layer)/the light transmitting thin layer with a low refractive index/the light transmitting thin layer with a high refractive index /the light transmitting thin layer with a low refractive index.

Concerning the above-described samples 8–13, the spectral reflectance, the electromagnetic wave shielding efficiency, and the adhesion of the film were measured in the same manner as the example 1.

Figure 9:
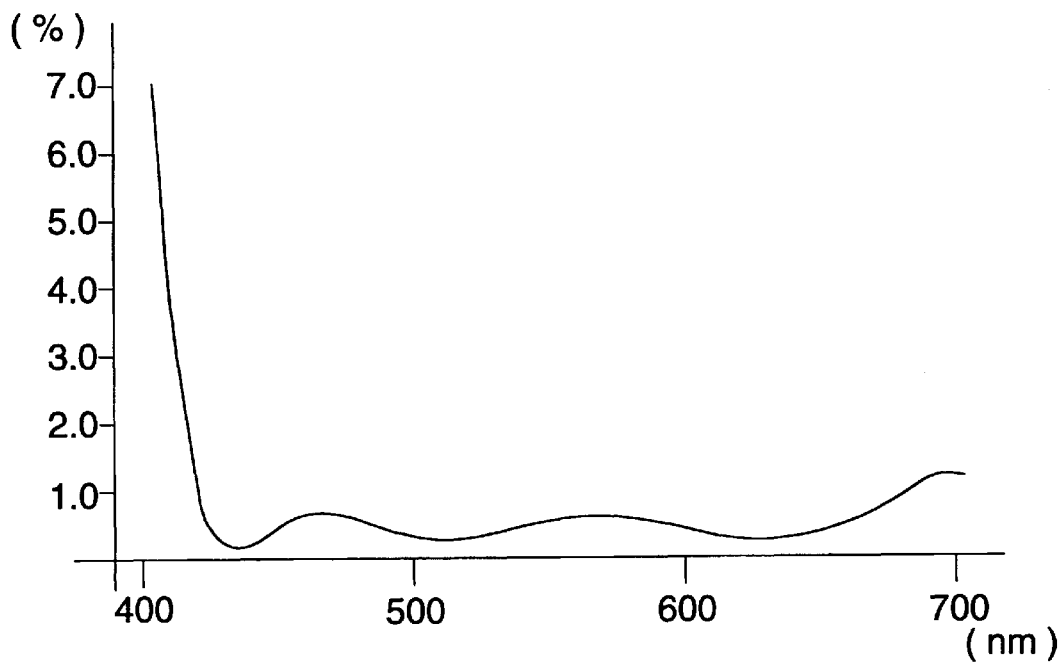
FIG. 9 is a drawing showing the spectral reflectance of the sample 9.
Figure 10:
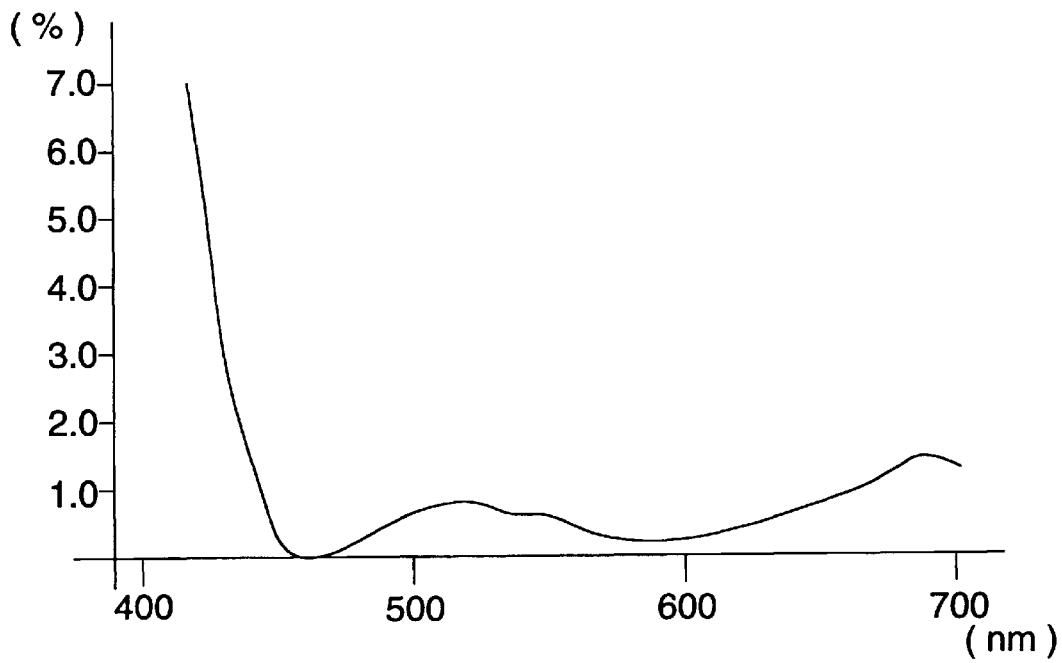
FIG. 10 is a drawing showing the spectral reflectance of the sample 10.
Figure 13:
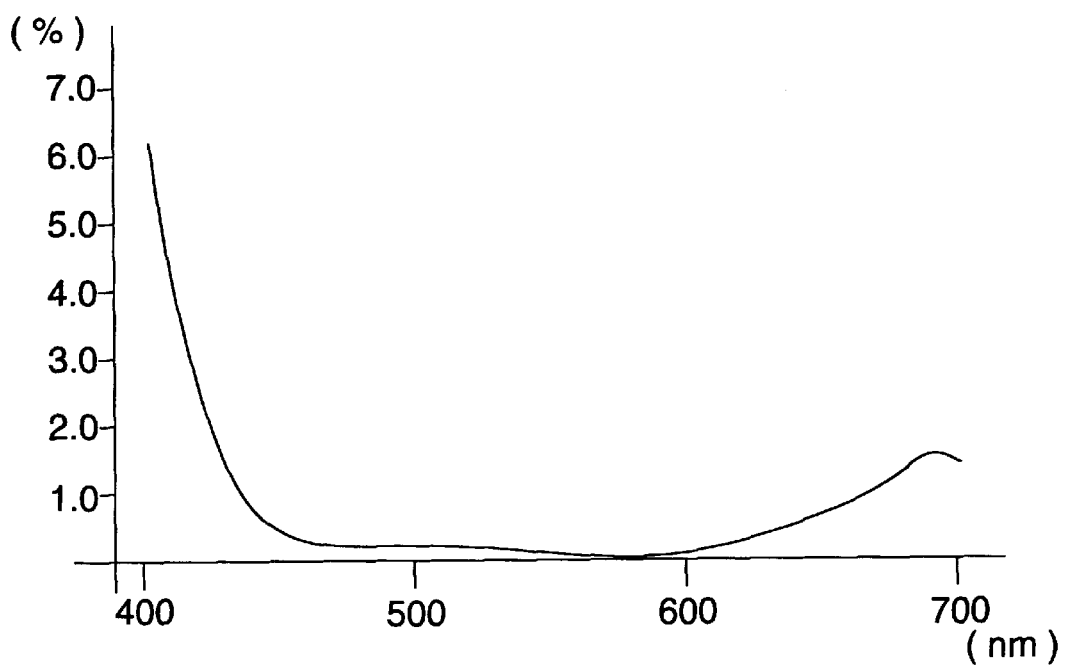
FIG. 13 is a drawing showing the spectral reflectance of the sample 13.
Figure 14:
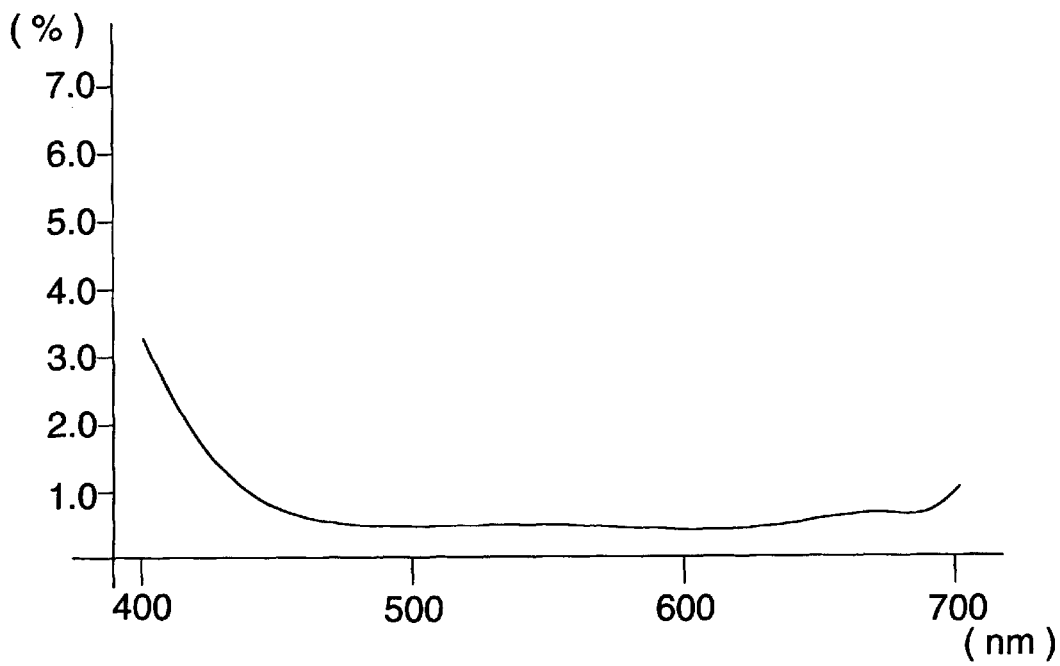
FIG. 14 is a drawing showing the spectral transmittance of the lens described in the example 3.
Figure 15:
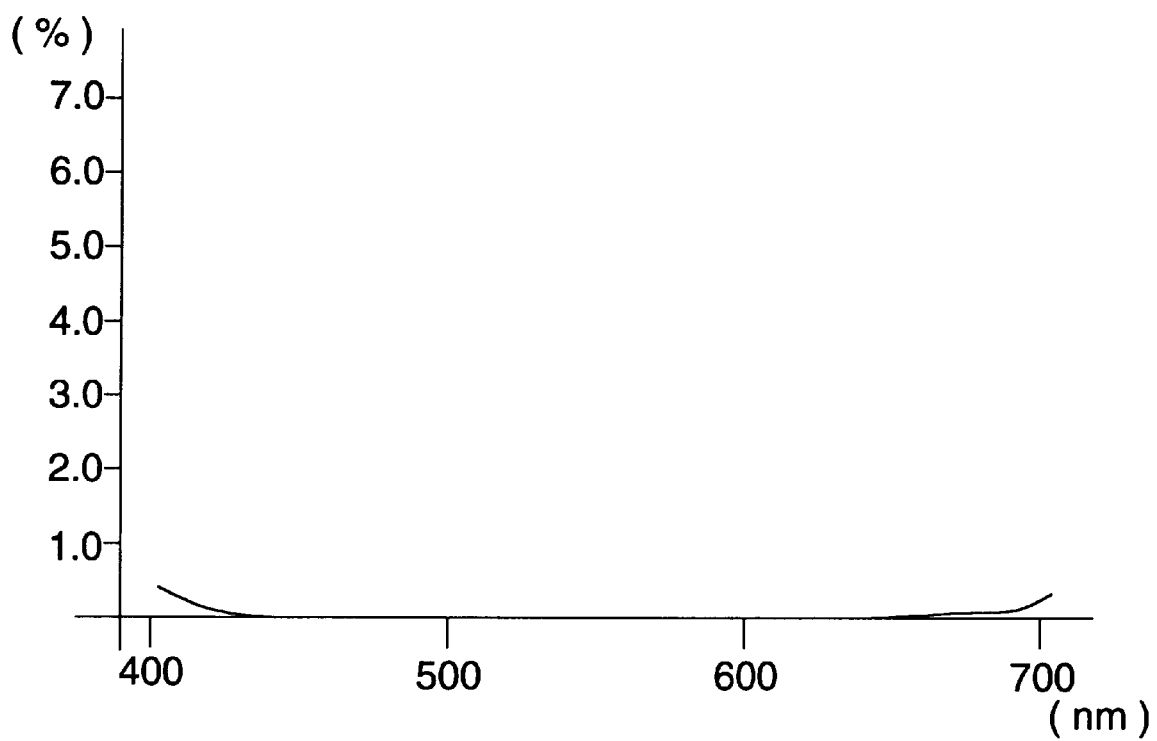
FIG. 15 is a drawing showing the spectral reflectance of the lens described in the example 4.

The spectral reflectance curves of the samples 9, 10, and 13 are shown in FIGS. 9, 10, and 13 respectively. In the figures the abscissa indicates the wavelength of light and the ordinate indicates the reflectance.

In Table 2, the results of the measurement of the electromagnetic wave shielding efficiency and the adhesion of the film are shown. Further, in the table the reflectance values at the wavelength of 540 nm and the values of the sheet resistance of the conductive layers are noted.

Besides, regarding samples 11 and 12, the spectral transmittance was measured in accordance with the following description.

"Spectral Transmittance"

By means of a spectrophotometer, the transmittance in each of the measuring wavelengths was measured.

Figure 11:
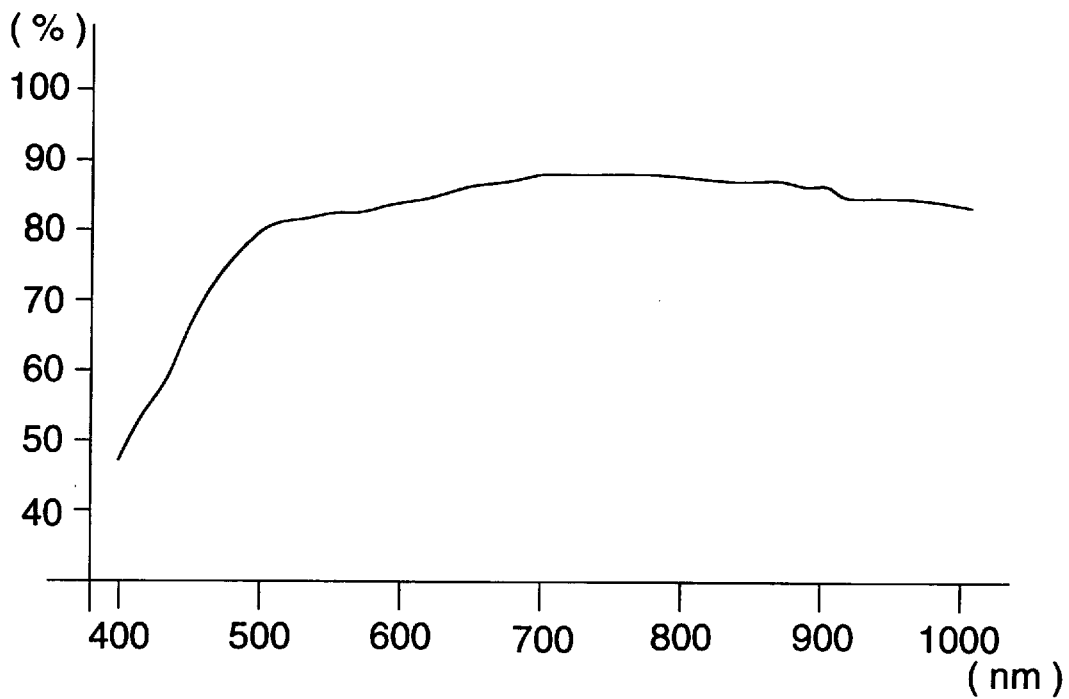
FIG. 11 is a drawing showing the spectral transmittance of the sample 11.
Figure 12:
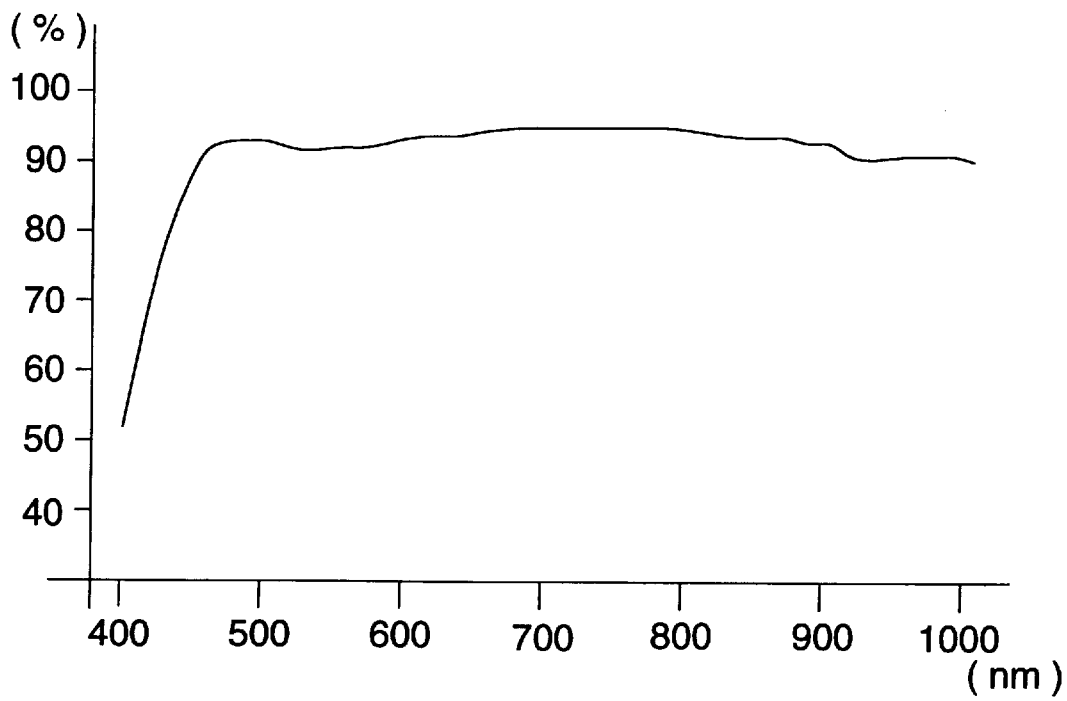
FIG. 12 is a drawing showing the spectral transmittance of the sample 12.

In FIGS. 11 and 12, the spectral transmittance curves of the samples 11 and 12 are shown respectively. In the figures, the abscissa indicates the wavelength of light and the ordinate indicates the transmittance.

It is clearly understood by FIGS. 11 and 12 that by changing the conditions in the evaporation process of the conductive layer, the transmittance of the sample can be changed, even with the same layer structure, without any substantial change of the sheet resistance of the conductive layer and the reflectance of the sample.

TABLE 2

| Sample No. | Reflectance (%) | Electromagnetic shielding efficiency (dB) | Sheet resistance of conductive layer ($\Omega/\square$) | Adhesion of film | |
|---|---|---|---|---|---|
| 8 | 0.7 | 20 | 35 | A | This invention |
| 9 | 0.5 | 25 | 30 | A | This invention |
| 10 | 0.7 | 20 | 35 | A | This invention |
| 11 | 0.5 | 25 | 30 | A | This invention |
| 12 | 0.5 | 25 | 30 | A | This invention |
| 13 | 0.2 | 10 | 200 | A | Comparison |

In the examples 1 and 2, the damage of the film of the obtained antireflection coating with the electromagnetic wave shielding effect can be prevented by making a friction withstanding overcoating on it.

Moreover, another substrate may be joined on the antireflection coating with the electromagnetic wave shielding effect.

Example 3

On one side of a lens made of a polycarbonate resin, the antireflection coating with the electromagnetic wave shielding effect composed of the two layers described in the following was formed successively.

The first layer: the layer of ITO (5% of tin content) with an optical thickness of $\lambda/2$ formed by R.F. ion plating process.

The second layer: the layer of aluminum oxide with an optical thickness of $\lambda/4$ ($\lambda$ is the design wavelength; in this example, $\lambda=520$ nm was used.) formed by vacuum evaporation process.

On the antireflection coating with the electromagnetic wave shielding effect thus obtained, a lens made of an acrylic resin is joined by an ultraviolet-ray setting adhesive to make a composite lens.

The electromagnetic wave shielding efficiency of the lens thus obtained was measured to find that it was an excellent one.

Example 4

On a PET (polyethylene terephthalate) sheet, the antireflection coating with the electromagnetic wave shielding effect composed of the three layers described in the following was formed successively.

The first layer: the layer of aluminum oxide with an optical thickness of $\lambda/4$ ($\lambda$ is the design wavelength; in this example, $\lambda=520$ nm was used.) formed by vacuum evaporation process.

The second layer: the layer of ITO (5% of tin content) with an optical thickness of $\lambda/2$ formed by R.F. ion plating process.

The third layer: the layer of aluminum oxide with an optical thickness of $\lambda/4$ ($\lambda$ is the design wavelength; in this example, $\lambda=520$ nm was used.) formed by vacuum evaporation process.

The film thus obtained was inserted between the two lenses made of acrylic resin (PMMA) and joined by an ultraviolet-ray setting adhesive to make a composite lens.

Concerning the lens thus prepared, the same degree of the electromagnetic wave shielding efficiency as the lens stated in the example 3 can be obtained.

Although a PET sheet was used in the example 4, the sheet to be used for this purpose is not limited to a PET sheet, but various kinds of sheets can be used. Further, regarding the adhesive, various kinds of adhesives can be used too. In this occasion, the color unevenness can be prevented by making the refractive index of the adhesive equal to that of the member to be joined.

It is said that the optical plastics which are used for camera lenses, spectacle lenses, CRT filters, and so forth are generally poor in shock-withstanding property, hence it is favorable due to the improvement of the shock-withstanding property to have one of the joined lenses made of polycarbonate, or to use an adhesive with a sufficient flexibility.

In this example an adhesive was used for cementing the optical members, but it is also possible to obtain the desired optical member by placing the optical member with the conductive antireflection coating in contact with a resin before hardening and after then making the resin cure.

The antireflection coating according to this invention has a low reflectance in visible region, an excellent transmittance in visible region, and an excellent electromagnetic wave shielding efficiency, in either case where it is provided with the light transmitting metallic thin layer or with the transparent conductive layer. Furthermore, it has an excellent film adhesion too. Besides, in case of using the light transmitting metallic thin layer, the amount of the transmitted infrared ray can be reduced.

What is claimed is:

1. An optical member having a coating for reducing a ray reflecting on the coating and for reducing an electromagnetic wave incident on the coating, the optical member comprising:

a transparent substrate; and said coating formed on said transparent substrate, comprising:

a first light transmitting thin layer having a high refractive index, formed over said transparent substrate;

a first light transmitting thin layer having a low refractive index, formed over said first light transmitting thin layer having the high refractive index;

a second light transmitting thin layer having a high refractive index, formed over said first light transmitting thin layer having the low refractive index;

a second light transmitting thin layer having a low refractive index, formed over said second light transmitting thin layer having the high refractive index; and a third light transmitting thin layer having a low refractive index, provided between said transparent substrate and said first light transmitting thin layer having the high refractive index, wherein at least one of said first light transmitting thin layer having the high refractive index and said second light transmitting thin layer having the high refractive index is a transparent conductive layer having a sheet resistivity of 100 $\Omega/\square$ or less, wherein at least one of said first light transmitting thin layer having the low refractive index and said second light transmitting thin layer having the low refractive index includes one of silicon dioxide, silicon monooxide and magnesium fluoride, wherein said transparent substrate is a plastic substrate, and wherein said third light transmitting thin layer having the low refractive index is provided on said transparent substrate.

2. The optical member of claim 1, wherein the transparent conductive layer includes indium oxide and tin.

3. The optical member of claim 1, wherein the sheet resistivity of the transparent conductive layer is 50 Ω/□ or less.

4. The optical member of claim 1, wherein said second light transmitting thin layer having the high refractive index is said transparent conductive layer having a sheet resistivity of 100 Ω/□ or less.

5. The optical member of claim 4, wherein said first light transmitting thin layer having the high refractive index and said second light transmitting thin layer having the high refractive index are said transparent conductive layers having a sheet resistivity of 100 Ω/□ or less.

6. The optical member of claim 1, wherein said transparent conductive layer having a sheet resistivity of 100 Ω/□ or less comprises indium oxide doped with tin (ITO).

* * * * *

UNITED STATES PATENT AND TRADEMARK OFFICE
CERTIFICATE OF CORRECTION

PATENT NO.: 6,104,534

DATED: August 15, 2000

INVENTORS: Tatsuo OHTA et al.

It is certified that an error appears in the above-identified patent and that said Letters Patent is hereby corrected as shown below:

Claim 1, Column 17, lines 1-2, "silicon monooxide" should read --silicon monoxide--.

Signed and Sealed this

Twenty-fourth Day of April, 2001

Attest:

NICHOLAS P. GODICI

Attesting Officer

Acting Director of the United States Patent and Trademark Office